No. 616,257. Patented Dec. 20, 1898.
A. H. REBER.
STEERING MECHANISM FOR TRACTION ENGINES.
(Application filed June 15, 1898.)
(No Model.)
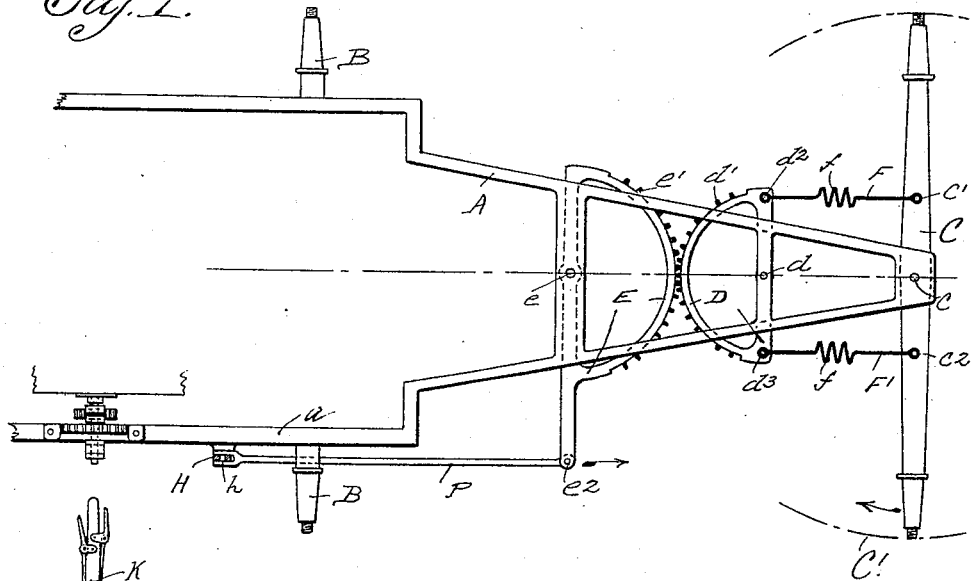

UNITED STATES PATENT OFFICE.

AARON H. REBER, OF STRAUSSTOWN, PENNSYLVANIA.

STEERING MECHANISM FOR TRACTION-ENGINES.

SPECIFICATION forming part of Letters Patent No. 616,257, dated December 20, 1898.

Application filed June 15, 1898. Serial No. 683,484. (No model.)

*To all whom it may concern:*

Be it known that I, AARON H. REBER, a citizen of the United States of America, and a resident of Strausstown, county of Berks, State of Pennsylvania, have invented certain new and useful Improvements in Steering Mechanism for Traction - Engines, &c., of which the following is a specification.

My invention relates to an improved steering mechanism for traction-engines, &c., and is fully described in connection with the accompanying drawings, the novel features being specifically pointed out in the claims.

Figure 1 is a plan view showing a portion of a traction-engine having my improved steering mechanism applied thereto. Fig. 2 is a partial side elevation showing the operating-gear, and Fig. 3 is a partial end view of the latter.

A represents the frame of a traction-engine, the rear portion $a$ of which is shown adapted to receive the fire-box of the boiler, which is commonly mounted upon the frame, but which is not here shown. The rear axle B B is rigidly fixed to the frame A. The front axle C is centrally pivoted to the front end of the frame by means of a king-bolt $c$, so that the ends which carry the wheels may be turned in the circle C' to regulate the direction of travel of the machine. In my improved steering mechanism this movement of the axle C is effected by a transversely-arranged lever D, which is centrally pivoted to the frame at $d$ and has its opposite ends $d^2$ and $d^3$ connected to the axle at points $c'$ and $c^2$ on opposite sides of the center $c$ by means of connecting-rods F and F', respectively, said rods being preferably provided with springs $f f$ to reduce the strains arising from inequalities and obstructions in the road-bed. Directly to the rear of the lever D is a similarly-mounted lever E, turning on a central pivot $e$. These two levers D and E are geared together, being provided, as shown, with toothed quadrants $d'$ and $e'$ of suitable radii.

The end $e^2$ of the lever E is connected by means of a rod P to a lever H, which lever is pivoted intermediately at $h$ to the frame A, and is connected also by rods J J' to an arm $g'$, fixed to an operating-shaft G, said rods being capable of variable connections, so as to regulate the leverage and relative movement as may be found desirable. To the shaft G is also fastened a toothed wheel or quadrant $g$, and arranged concentrically with this wheel and fixed to the frame A of the machine is a locking-quadrant N. The forked lower end $k$ of the hand-lever K spans the wheel $g$ and is loosely mounted at $k'$ $k'$ on the shaft. This hand-lever is provided with two latches G' and N' to engage, respectively, the shaft-wheel $g$ and the fixed quadrant N.

When it is desired to move the front axle in the direction indicated by the arrow, the hand-lever K is moved in the same direction, the latch G' being in engagement with the toothed wheel $g$, so as to cause the turning of the shaft G and the movement of the connecting parts in the direction indicated by the arrows. By releasing the latch N' the latter drops into engagement with the fixed quadrant N on the frame, thus locking the parts in the position to which they have been set. By raising both the latches the lever may be freely turned on the shaft and a new engagement with the wheel $g$ thereon secured, thus permitting of any amount of movement that may be required by the variable connection to the intermediate lever H.

What I claim is—

1. The combination with the frame and the centrally-pivoted front axle, of a steering-gear comprising the shaft G, with toothed arm or wheel $g$ fastened thereto, the fixed concentric quadrant N, the hand-lever K pivoted to said shaft and provided with separate latches G' and N' engaging said toothed arm and quadrant respectively, and connecting mechanism between said shaft and axle, whereby the latter may be moved and locked at varying angles substantially as described.

2. The combination with the frame and the centrally-pivoted front axle and rigidly-fixed rear axle, of the independently-pivoted levers D and E with intermeshing gears $d'$ $e'$, yielding connections F F' to the front axle, an operating-shaft G with hand-lever mechanism for operating the same, an intermediately-pivoted operating-lever H, and adjustable connections between said lever H and the operating-shaft G and lever E respectively, substantially as described.

Signed by me, at Strausstown, Berks county, Pennsylvania, this 4th day of June, A.D. 1898.

AARON H. REBER.

Witnesses:
JACOB W. SEITZINGER,
WILLIE T. MCALISTER.